US012608819B2

(12) United States Patent
Nakamura et al.

(10) Patent No.: US 12,608,819 B2
(45) Date of Patent: Apr. 21, 2026

(54) OBJECT DETECTION DEVICE, METHOD, AND PROGRAM

(71) Applicant: NTT, Inc.

(72) Inventors: Ken Nakamura, Tokyo (JP); Hiroyuki Uzawa, Tokyo (JP); Daisuke Kobayashi, Tokyo (JP); Saki Hatta, Tokyo (JP); Yuya Omori, Tokyo (JP); Shuhei Yoshida, Tokyo (JP)

(73) Assignee: NTT, Inc., Tokyo (JP)

( * ) Notice: Subject to any disclaimer, the term of this patent is extended or adjusted under 35 U.S.C. 154(b) by 291 days.

(21) Appl. No.: 18/275,786

(22) PCT Filed: Feb. 9, 2021

(86) PCT No.: PCT/JP2021/004839
§ 371 (c)(1),
(2) Date: Aug. 3, 2023

(87) PCT Pub. No.: WO2022/172341
PCT Pub. Date: Aug. 18, 2022

(65) Prior Publication Data
US 2024/0119605 A1 Apr. 11, 2024

(51) Int. Cl.
*G06T 7/215* (2017.01)
*G06T 7/246* (2017.01)
(Continued)

(52) U.S. Cl.
CPC .............. *G06T 7/215* (2017.01); *G06T 7/248* (2017.01); *G06V 10/82* (2022.01); *G06V 20/46* (2022.01);
(Continued)

(58) Field of Classification Search
None
See application file for complete search history.

(56) References Cited

U.S. PATENT DOCUMENTS

2017/0148148 A1* 5/2017 Okuyama ................. G06T 5/50
2018/0012368 A1* 1/2018 Tanaka .................... G06T 7/254
(Continued)

OTHER PUBLICATIONS

Liu et. al. (2016) "SSD: Single Shot MultiBox Detector", ECCV 2016, 17 pages.
(Continued)

*Primary Examiner* — Vikkram Bali

(57) ABSTRACT

A calculation unit (22) sets each frame, of a moving image including a plurality of frames, as a target frame, calculates a motion vector with reference to a reference frame over an entirety of the target frames, and calculates an index indicating a magnitude of change between a key frame and the target frame, which is represented by using the motion vector, a judgement unit (25) judges whether or not the calculated index is equal to or greater than a predetermined threshold value, a first detection unit (27) detects a region indicating an object from the target frame by using an object detection model in a case in which the index is equal to greater than the threshold value, a second detection unit (28) detects a region on the target frame, which is obtained by correcting a position of a region detected in the reference frame by using the motion vector in a case in which the index is less than the threshold value, and an output unit (30) outputs information of the region detected by the first detection unit (27) and information of the region detected by the second detection unit (28).

8 Claims, 8 Drawing Sheets

(51) Int. Cl.
  G06V 10/82          (2022.01)
  G06V 20/40          (2022.01)

(52) U.S. Cl.
  CPC .............. *G06T 2207/10016* (2013.01); *G06T 2207/20084* (2013.01)

(56) References Cited

U.S. PATENT DOCUMENTS

2020/0013190  A1      1/2020  Li et al.
2020/0193609  A1*     6/2020  Dharur ................... G06T 7/143

OTHER PUBLICATIONS

Redomon et al. (2018) "YOLOv3: An Incremental Improvement" [online] website: https://arxiv.org/abs/1804.02767.
Buckler et. al. (2018) "EVA2: Exploiting Temporal Redundancy in Live Computer Vision", ISCA 2018, 14 pages.
Luo Hao et al., "Detect or Track: Towards Cost-Effective Video Object Detection/Tracking," Proceedings of the AAAI Conference on Artificial Intelligence, vol. 33, No. 10, Jan. 1, 2019, pp. 8803-8810.

* cited by examiner

OBJECT DETECTION DEVICE, METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2021/004839, filed on 9 Feb. 2021, the disclosure of which is hereby incorporated herein by reference in its entirety.

TECHNICAL FIELD

The disclosed technology relates to an object detection device, an object detection method, and an object detection program.

BACKGROUND ART

In recent years, an object detection method using a convolution neural network (hereinafter referred to as "CNN") has been widely used. For example, techniques such as SSD (Single Shot Multibox Detector. NPL 1), YOLO (You Only Look Once) v3 (NPL 2), and the like are known. In these methods, an input image is input to a CNN which is an object detection model, and a region indicating an object included in the input image is detected. When a plurality of objects is included in the input image, a region is detected for each object. Then, in these methods, the attribute of the object indicated by the image of the detected region, the reliability of the detection result, rectangular information indicating a position and size of the detected region in the image, and the like are generally outputted as the detection result of the object detection. Note that the attribute of the object is a type of an object such as a car, a person, a dog, or the like. When these techniques are applied to a moving image (video), it is necessary to repeat processing of object detection for all frames included in the moving image, and increase of the processing amount is a problem.

On the other hand, there is a method for obtaining similar effects while reducing the processing amount compared to the case where object detection by CNN is performed in all frames by dividing the frame into a frame where object detection by CNN is performed and a frame where object tracking is performed on the basis of the result.

In addition, there has been proposed a method of performing object detection by CNN in a key frame, predicting a feature map of a middle layer of CNN from the key frame by motion compensation in other frames, and performing normal processing of CNN for subsequent layers (NPL 3).

CITATION LIST

Non Patent Literature

NPL 1 Wei Liu, et. al., "SSD: Single Shot MultiBox Detector", ECCV2016

NPL 2 J. Redomon, et. al., "YOLOv3: An Incremental Improvement", https://arxiv.org/abs/1804.02767

NPL 3 M. Buckler, et. al., "EVA2: Exploiting Temporal Redundancy in Live Computer Vision", ISCA2018

SUMMARY OF INVENTION

Technical Problem

However, in a technique of dividing the frame into a frame for performing object detection by CNN and a frame for tracking an object on the basis of the result, when a new object appears in the frame for performing only tracking, not detecting the new object is a problem.

Further, the method described in NPL 3 has a problem that the throughput of the latter half layer of CNN is large. In addition, in the method described in NPL 3, motion compensation of a feature map does not effectively function for a moving image having a large fine change in motion, so that a deterioration of accuracy and efficiency of the object detection is a problem.

In addition, there is a demand for a technique for more efficiently performing the object detection for each frame of a moving image without reducing accuracy, for example, in a case where the object detection for a moving image of higher definition is desired to be processed in real time.

The disclosed technology has been devised in consideration of the points described above and an object thereof is to improve the efficiency for the object detection in the moving image without reducing the accuracy.

Solution to Problem

A first aspect of the present disclosure relates to an object detection device and includes a calculation unit that sets each frame, of a moving image including a plurality of frames, as a target frame, calculates a motion vector with reference to a reference frame over an entirety of the target frames, and calculates an index indicating a magnitude of change between a key frame and the target frame, which is represented by using the motion vector, a judgement unit that judges whether or not the index calculated by the calculation unit is equal to or greater than a predetermined threshold value, a first detection unit that detects a region indicating an object from the target frame by using an object detection model in a case in which the index is equal to greater than the threshold value, a second detection unit that detects a region on the target frame, which is obtained by correcting a position of a region detected in the reference frame by using the motion vector in a case in which the index is less than the threshold value, and an output unit that outputs information of the region detected by the first detection unit and information of the region detected by the second detection unit.

A second aspect of the present disclosure relates to an object detection method and includes a step in which a calculation unit sets each frame, of a moving image including a plurality of frames, as a target frame, calculates a motion vector with reference to a reference frame over an entirety of the target frames, and calculates an index indicating a magnitude of change between a key frame and the target frame, which is represented by using the motion vector, a step in which a judgement unit judges whether or not the index calculated by the calculation unit is equal to or greater than a predetermined threshold value, a step in which a first detection unit detects a region indicating an object from the target frame by using an object detection model in a case in which the index is equal to or greater than the predetermined threshold value, a step in which a second detection unit detects a region on the target frame, which is obtained by correcting a position of a region detected in the reference frame by using the motion vector in a case in which the index is less than the predetermined threshold value, and a step in which an output unit outputs information of the region detected by the first detection unit and information of the region detected by the second detection unit.

A third aspect of the present disclosure relates to an object detection program for causing a computer to function as each unit that constitutes the object detection device.

Advantageous Effects of Invention

According to the disclosed technology, efficiency can be improved without reducing accuracy in object detection for a moving image.

DESCRIPTION OF EMBODIMENTS

Example embodiments of the technology in the disclosure will be described below with reference to the figures. Note that in the figures, identical or equivalent constituent elements and parts have been allocated identical reference symbols. Further, dimension ratios in the figures have been exaggerated to facilitate the description and may therefore differ from the actual ratios.

First Embodiment

An object detection device according to a first embodiment calculates a motion vector for each frame of a moving image to be detected, and calculates an index indicating a magnitude of change between frames by using the motion vector. Then, the object detection device performs object detection by an object detection model when the index is large, and corrects and outputs position information of an object detection result of a reference frame used as a reference for the motion vector calculation when the index is not large. Thus, efficient processing is achieved while avoiding deterioration in accuracy of object detection with respect to appearance of a new object and deformation of the object.

Figure 1:
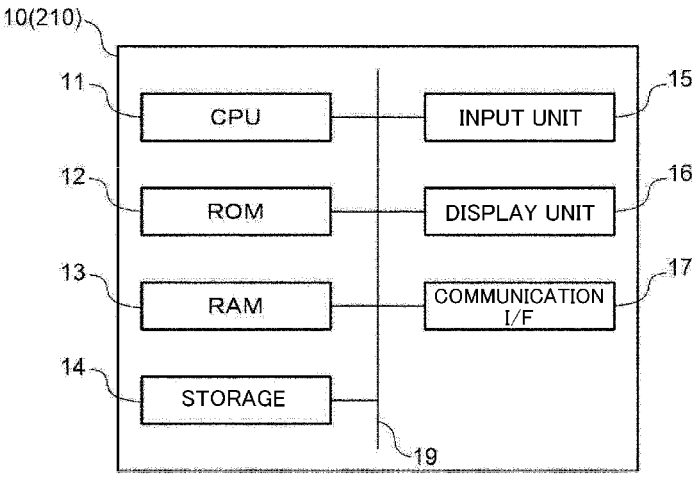
FIG. 1 is a block diagram showing a hardware configuration of an object detection device.

FIG. 1 is a block diagram showing a hardware configuration of an object detection device 10 according to a first embodiment. As shown in FIG. 1, the object detection device 10 includes a central processing unit (CPU) 11, a read only memory (ROM) 12, a random access memory (RAM) 13, a storage 14, an input unit 15, a display unit 16, and a communication I/F (interface) 17. The respective configurations are connected to each other communicably by a bus 19.

The CPU 11 is a central calculation processing unit that executes various programs and controls the respective units. More specifically, the CPU 11 reads a program from the ROM 12 or the storage 14 and executes the program using the RAM 13 as a working region. The CPU 11 controls the respective configurations described above and performs various types of calculation processing in accordance with the program stored in the ROM 12 or the storage 14. In the present embodiment, an object detection program for executing object detection processing to be described below is stored in the ROM 12 or the storage 14.

The ROM 12 stores various programs and various types of data. The RAM 13 temporarily stores a program or data as the working region. The storage 14 is constituted by a storage device such as a hard disk drive (HDD) or a solid state drive (SSD), and stores various programs including an operating system and various types of data.

The input unit 15 includes a pointing device such as a mouse and a keyboard, and is used to input various types of input.

The display unit 16 is a liquid crystal display, for example, and displays various information. By employing a touch panel system, the display unit 16 may also function as the input unit 15.

The communication I/F 17 is an interface for communicating with another equipment. In the communication, a wired communication standard such as Ethernet™ and FDDI or a wireless communication standard such as 4G, 5G, and Wi-Fi™ is used.

Figure 2:
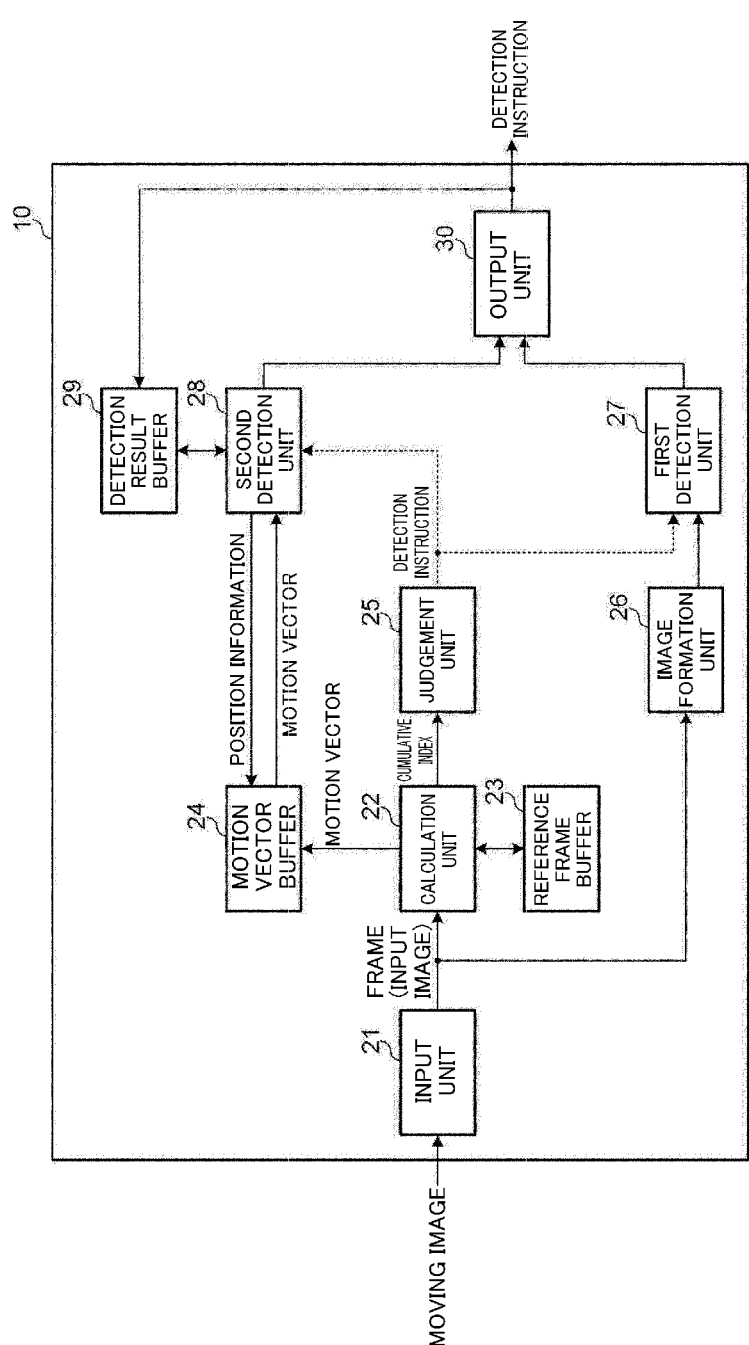
FIG. 2 is a block diagram showing an example of a functional configuration of the object detection device according to a first embodiment.

Next, functional configurations of the object detection device 10 will be described. FIG. 2 is a block diagram showing an example of the functional configuration of the object detection device 10. As shown in FIG. 2, the object detection device 10 includes, as a functional configuration, an input unit 21, a calculation unit 22, a reference frame buffer 23, a motion vector buffer 24, a judgement unit 25, and an image formation unit 26. Further, the object detection device 10 includes, as a functional configuration, a first detection unit 27, a second detection unit 28, a detection result buffer 29, and an output unit 30. The respective function configurations are realized when the CPU 11 reads the object detection program stored in the ROM 12 or the storage 14 and develops and performs the read program on the RAM 13.

The input unit 21 receives the moving image inputted to the object detection device 10, and sequentially outputs each frame constituting the moving image as an input image to each of the calculation unit 22 and the image formation unit 26 in the time series order of the moving image. Here, it is assumed that frame numbers of n=0, 1, 2, . . . are given to the respective frames included in the moving image in order from the head. In the following description, the frame of the frame number n is referred to as "frame n". The input unit 21 sets the frame n as a target frame.

The calculation unit 22 receives the target frame outputted from the input unit 21, and calculates a motion vector with reference to a reference frame stored in the reference frame buffer 23 over the entire target frame, that is, for the entire input image. The reference frame buffer 23 stores the reference frame which is a frame before the target frame in a time series order and becomes a reference when the calculation unit 22 calculates the motion vector. In the following, a case where the reference frame is a frame immediately before the target frame, that is, a case where the reference frame of the frame n is a frame n−1 will be described.

Specifically, the calculation unit 22 performs motion search between the target frame and the reference frame, and calculates a motion vector field V (n) represented by the motion vector for each block obtained by dividing the entire target frame (frame n). The block is a region of a minimum unit for obtaining the motion vector, and may be a block having the number of horizontal pixels sx and the number of vertical pixels sy, for example. Further, as a method of motion search, a conventional known method such as a method using block matching and a method using gradient may be used, in the first embodiment, the method is not limited. The calculation unit 22 stores the calculated motion vector field V (n) in the motion vector buffer 24.

In addition, the calculation unit 22 calculates an index indicating a magnitude of change between a key frame and the target frame, which is represented by using the motion vector. The key frame is a frame closest to the target frame among frames in which the object detection is performed by an object detection model in the first detection unit 27 to be described later. Specifically, the calculation unit 22 first calculates, as an index between the reference frame and the target frame, an index indicating a magnitude of prediction error of motion compensation, which is an error between a motion compensation prediction image generated by using the reference frame and the calculated motion vector field, and the target frame. The calculation unit 22 may calculate, as a prediction error of motion compensation, a prediction difference absolute value sum sad (n) of the entire target frame (frame n), for example, as shown by the following equation (1).

$$sad(n) = \qquad\qquad (1)$$
$$\sum\nolimits_{-c}\sum\nolimits_{-x}\sum\nolimits_{-y}|I(c, n, x, y) - I(c, n-1, x - mvx(x, y), y - mvy(x, y))|$$

In the equation (1), I (c, n, x, y) represents pixel values of a channel c of coordinates (x, y) in an image of a frame n and mvx (x, y) and mvy (x, y) represent x and y components of the motion vector at coordinates (x, Y) in the image of the frame n. For example, when the moving image inputted to the object detection device 10 consists of three components of RGB, the channel c corresponds to each component. In addition, although x and y are integer values, mvx (x, y) and mvy (x, y) can take decimal values. When the coordinate of the argument 10 in the image is a decimal, an existing decimal pixel interpolation method may be applied. Further, in order to avoid the influence of noise included in the frame n and the accuracy error of the motion vector becoming dominant, correction may be performed so that the prediction difference absolute value sum sad (n) is suppressed to a value less than a predetermined threshold value on the basis of the variance of the frame n for each block, the difference between adjacent pixels, and the like.

Further, the calculation unit 22 may calculate an index indicating the magnitude of variation in the motion vector in the entire target frame as an index between the reference frame and the target frame. The calculation unit 22 may calculate a difference absolute value sum diff (n) of the motion vector components, which is shown by, for example, the following equation (2), as an index indicating the variation of the motion vector.

$$diff(n) = \qquad\qquad (2)$$
$$\sum\nolimits_{-x}\sum\nolimits_{-y}\{|mvx(x, y) - mvx(x + sx, y)| + |mvx(x, y) - mvx(x, y + sy)| +$$
$$|mvy(x, y) - mvy(x + sx, y)| + |mvy(x, y) - mvy(x, y + sy)|\}$$

In the equation (2), sx and sy are the number of pixels in the horizontal direction and the number of pixels in the vertical direction of the block of the minimum unit for obtaining the motion vector, as described above. That is, the difference absolute value sum diff (n) shown in equation (2) is the sum of absolute values of differences between x and y components of motion vectors between blocks adjacent to each other in the horizontal direction and the vertical direction.

In addition, the calculation unit 22 calculates the cumulative value (hereinafter referred to as "cumulative index") of the above indexes calculated for each frame from the key frame to the target frame as an index for comparison with a threshold value by the judgement unit 25 which will be described later. Specifically, the calculation unit 22 calculates a cumulative index sad_act of sad (n) and a cumulative index diff_ac of diff (n). The calculation unit 22 outputs the calculated cumulative index to the judgement unit 25.

Further, the calculation unit 22 stores the frame n in the reference frame buffer 23 in order to use the frame n as a reference frame when the frame n+1 becomes a target frame.

The judgement unit 25 receives the cumulative index outputted from the calculation unit 22, and judges whether or not the cumulative index is equal to or more than a predetermined threshold value. Specifically, the judgement unit 25 judges that the cumulative index is equal to or more than the threshold value, when sad_ac is equal to or more than a threshold value TH_sad, or when diff_ac is equal to or more than a threshold value TH_duff. On the other hand, the judgement unit 25 judges that the cumulative index is less than the threshold value when sad_ac is less than the threshold value TH_sad and diff_ac is less than the threshold value TH_diff.

When the cumulative index is equal to or larger than the threshold value, the judgement unit 25 judges that the change between the key frame and the target frame is large, and outputs a detection instruction for instructing the object detection processing to the first detection unit 27 for performing the object detection by using the object detection model. On the other hand, when the cumulative index is less than the threshold value, the judgement unit 25 judges that the change between the key frame and the target frame is small, skips the object detection by the object detection model, and outputs a detection instruction to the second detection unit 28 for correcting the past detection result and performing the object detection. When the detection instruction is outputted to the first detection unit 27, the judgement unit 25 initializes, that is, sets the cumulative indexes (sad_ac and diff_ac) calculated by the calculation unit 22 to 0.

The image formation unit 26 receives the target frame outputted from the input unit 21, resizes the target frame to a size that can be inputted to the object detection model of the first detection unit 27, and outputs the resized target frame to the first detection unit 27.

When receiving the detection instruction outputted from the judgement unit 25, the first detection unit 27 receives the target frame outputted from the image formation unit 26, and detects a region indicating the object from the target frame by using the object detection model. The object detection model may be, for example, a model using CNN such as SSD or YOLO. Specifically, the first detection unit 27 detects each of regions indicating a plurality of objects included in the target frame by using the object detection model. Then, the first detection unit 27 outputs, for each of the detected regions, an attribute of the object indicated by the image of the region, a reliability of a detection result, rectangular information indicating the position and size of the detected region in the target frame, or the like to the output unit 30 as a detection result of the object detection.

Figure 3:
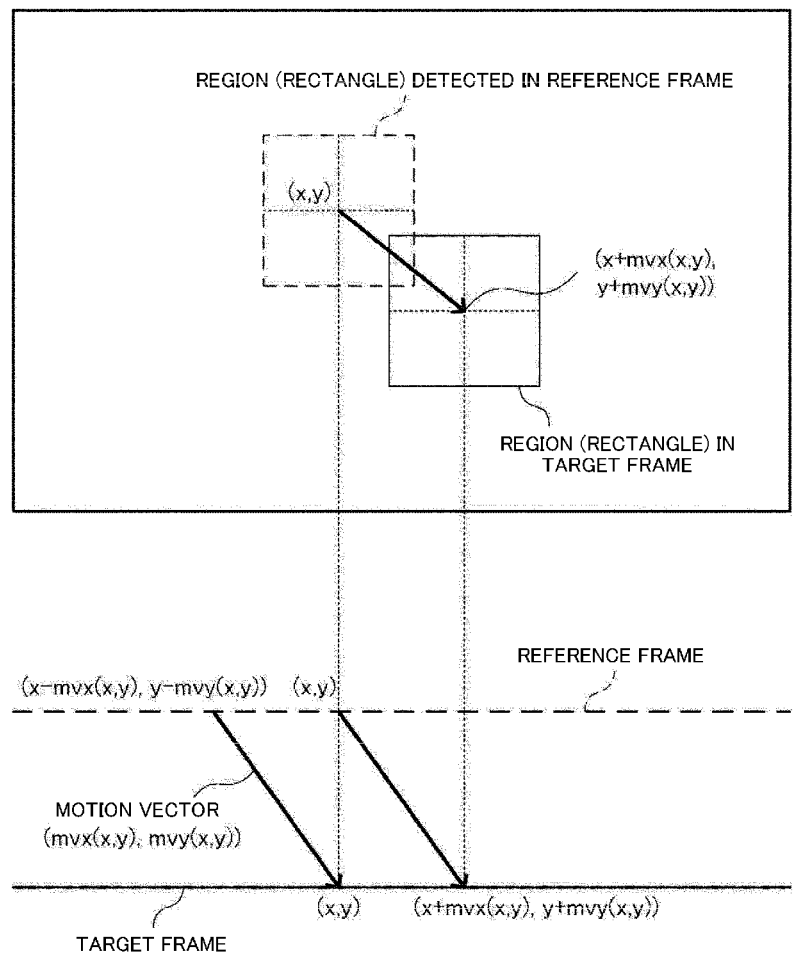
FIG. 3 is a diagram for explaining a method of detecting a region indicative of an object from a target frame by using a reference frame and a motion vector.

When receiving the detection instruction outputted from the judgement unit 25, the second detection unit 28 detects a region on the target frame in which the position of the region detected in the reference frame is corrected using the motion vector. Specifically, the second detection unit 28 acquires the detection result of the reference frame stored in the detection result buffer 29. Then, as shown in FIG. 3, the second detection unit 28 acquires from the motion vector buffer 24 a motion vector for the coordinates (position information) of the target frame corresponding to the center coordinates of the rectangular information of each object detected in the reference frame. Then, the second detection unit 28 detects a rectangle having a coordinate on the target frame corresponding to a position obtained by correcting the center coordinate of the rectangle in the reference frame by the acquired motion vector as the center coordinate, and having the same size as the rectangle in the reference frame from the target frame. For example, as shown in FIG. 3, it is assumed that the center coordinates of the rectangle detected in the reference frame are (x, y), and the motion vectors for the coordinates (x, y) of the target frame are (mvx (x, y), mvy (x, y)), in this case, the second detection unit 28 sets the corrected center coordinates in the target frame as (x+mvx (x, y), y+mvy (x, y)).

Note that, strictly speaking, as shown in FIG. 3, the motion vectors (mvx (x, y), mvy (x, y)) are motion vectors at coordinates (x, y) in the image of the target frame, and are different from the motion vectors at coordinates (x, y) in the image of the reference frame. Therefore, there is a possibility that a deviation occurs in the position of the rectangle detected in the target frame. Therefore, the second detection unit 28 may perform additional correction such as replacing the motion vector with respect to the coordinates (x+mvx (x, y), Y+may (x, y)) of the target frame by referring again. In addition, in order to mitigate the influence of local variations in the motion vectors, the second detection unit 28 may calculate and store an average value of a plurality of neighboring motion vectors, and use the average value instead of (mix (x, y), mvy (x, y)).

The second detection unit 28 acquires rectangular information representing the position and size of the region (rectangle) detected on the basis of the corrected center coordinates using the motion vector. In addition, the second detection unit 28 acquires, from the detection result buffer 29, the attribute of the object about the corresponding region detected in the reference frame, reliability of the detection result, and the like. The second detection unit 28 collects these pieces of information and outputs them to the output unit 30 as the detection result of the object detection in the target frame.

The output unit 30 acquires the detection result outputted from the first detection unit 27 and the detection result outputted from the second detection unit 28. In addition, the output unit 30 stores the detection result of the frame n in the detection result buffer 29 in order to refer to the frame n when the frame n+1 becomes the target frame.

Figure 4:
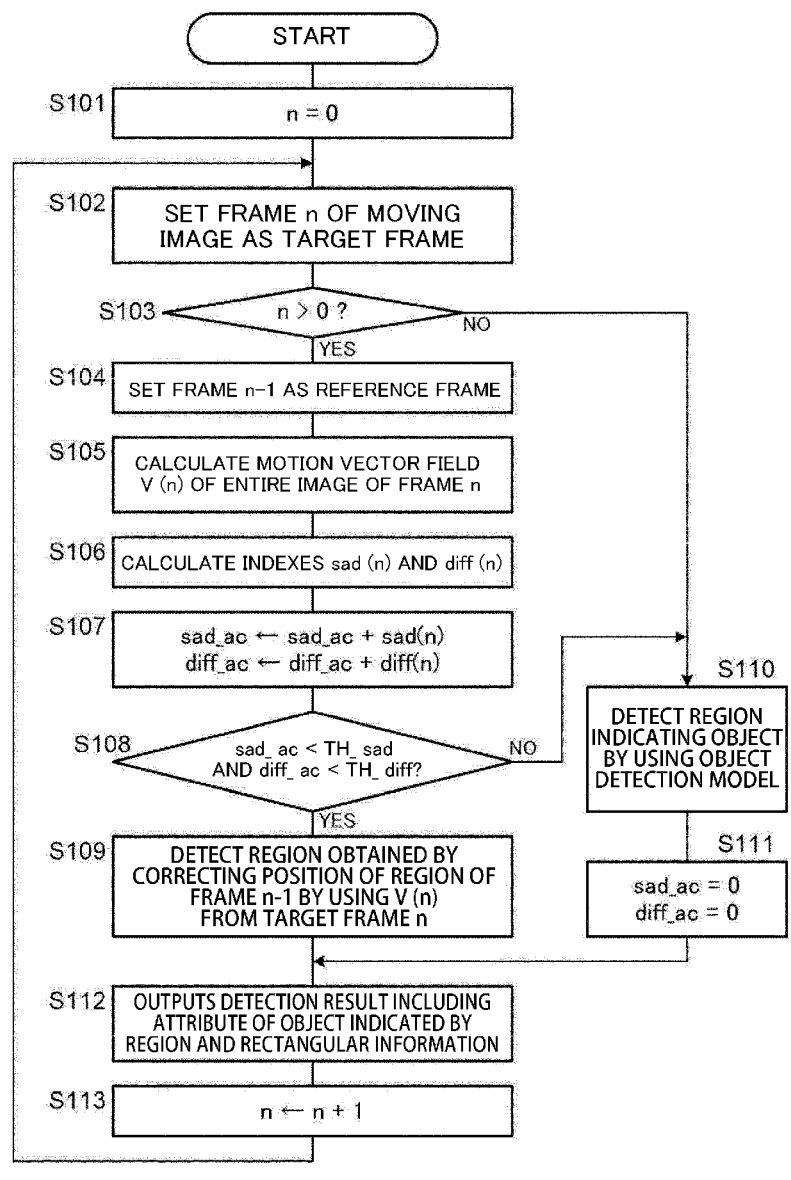
FIG. 4 is a flowchart showing a flow of object detection processing according to the first embodiment.

Next, the operation of the object detection device 10 will be described. FIG. 4 is a flowchart showing a flow of object detection processing by the object detection device 10. The object detection processing is performed when the CPU 11 reads the object detection program from the ROM 12 or the storage 14 and develops and performs the program on the RAM 13. Note that the object detection processing is an example of the object detection method of the present disclosure.

In a step S101, the CPU 11 sets a variable n indicating a frame number of each frame constituting the moving image to 0 as the input unit 21. Next, in a step S102, the CPU 11 sets a frame n of the moving image as a target frame as the input unit 21. Then, in a step S103, the CPU 11, as the input unit 21, judges whether or not n is greater than 0. When n>0 is satisfied, the processing proceeds to a step S104, and when n=0, the processing proceeds to a step S110. In the step S104, the CPU 11 sets a frame n−1 as a reference frame as the input unit 21.

Next, in a step S105, the CPU 11 performs motion search between the frame n and the frame n−1 as the calculation unit 22, and calculates a motion vector field V (n) represented by a motion vector for each block obtained by dividing the entire image of the frame n. Then, the CPU 11 stores the calculated motion vector field V (n) in the motion vector buffer 24 as the calculation unit 22.

Next, in a step S106, the CPU 11 uses the motion vector as the calculation unit 22, and calculates, for example, sad (n) shown by the equation (1) and diff (n) shown by the equation (2) as indexes representing a magnitude of change between the frame n−1 and the frame n.

Next, in a step S107, the CPU 11 calculates a cumulative index from the key frame to the target frame by adding sad (n) calculated in the step S106 to sad_ac and adding diff (n) to diff_ac as the calculation unit 22. Then, the CPU 11 outputs, as the calculation unit 22, the calculated cumulative index to the judgement unit 25.

Next, in a step S108, the CPU 11 judges, as the judgement unit 25, whether or not the sad_ac is less than the threshold value TH_sad, and the diff_ac is less than the threshold value TH_diff. When sad_ac<TH_sad and diff_ac<TH_diff are satisfied, the processing proceeds to a step S109, and when sad_ac≥TH_sad or diff_ac≥TH_diff is satisfied, the processing proceeds to a step S110.

In the step S109, the CPU 11 outputs a detection instruction to the second detection unit 28 as the judgement unit 25. Then, the CPU 11, as the second detection unit 28, corrects the position of the region detected in the frame n−1 by using the motion vector, and detects a region on the frame n. Further, the CPU 11, as the second detection unit 28, outputs the detection result including the attribute of the object, the reliability, the rectangular information, etc. for each of the regions detected from the frame n to the output unit 30, and the processing proceeds to a step S112.

On the other hand, in the step S110, the CPU 11 outputs a detection instruction to the first detection unit 27 as the judgement unit 25. Further, the CPU 11, as the image formation unit 26, resizes the frame n to a size that can be inputted to the object detection model of the first detection unit 27, and outputs the result to the first detection unit 27. Then, the CPU 11 receives the frame n outputted from the image formation unit 26 as the first detection unit 27, and detects a region indicating the object from the frame n by using the object detection model. Further, the CPU 11, as the first detection unit 27, outputs the detection result including the attribute of the object, the reliability, the rectangular information or the like for each of the regions detected from the frame n to the output unit 30.

Next, in a step S111, the CPU 11 initializes, as the judgement unit 25, sad_ac and diff_ac which are the cumulative indexes calculated by the calculation unit 22, that is, 0 is set, and the processing proceeds to a step S112.

In the step S112, the CPU 11 receives and outputs, as the output unit 30, the detection result outputted in the step S109 or S110. In addition, the CPU 11 stores, as the output unit 30, the detection result of the frame n in the detection result buffer 29.

Next, in a step S113, the CPU 11 increases, as the input unit 21, n by 1, and the processing returns to the step S102.

As described above, the object detection device according to the first embodiment uses each frame of the moving image including a plurality of frames as the target frame, and calculates the motion vector with reference to the reference frame over the entire target frame. In addition, the object detection device calculates the index indicating the magnitude of change between the key frame and the target frame represented by using the motion vector. The key frame is a frame closest to the target frame among frames in which object detection is performed by using the object detection model. Then, the object detection device, when the index is equal to or more than the predetermined threshold value, detects a region indicating the object from the target frame by using the object detection model. On the other hand, when the index is less than the threshold value, the object detection device detects a region on the target frame in which the position of the region detected in the reference frame is corrected by using the motion vector. Then, the object detection device outputs the detection result including the attitude of the object, the reliability, the rectangular information, or the like for the region detected by any of the detection methods. Thus, the object detection device according to the first embodiment can improve efficiency without reducing accuracy in the object detection for the moving image.

Second Embodiment

Next, a second embodiment will be described. An object detection device according to a second embodiment performs integration of an object detection result of each partial image obtained by dividing a frame into a plurality of parts and an object detection result of a reduced image obtained by reducing an entire frame, that is, performs object detection by using division and synthesis of the frame. The object detection device according to the second embodiment judges whether or not to skip the object detection processing by using an object detection model by using an index indicating a magnitude of change between a key frame and the target frame in the object detection processing for each partial image in the frame in the same manner as in the first embodiment.

Note that, in the object detection device according to the second embodiment, the same components as those of the object detection device 10 according to the first embodiment are denoted by the same reference signs and detailed description thereof will be omitted. Further, since a hardware configuration of the object detection device according to the second embodiment is the same as that of the object detection device 10 according to the first embodiment shown in FIG. 1, description thereof will be omitted.

Figure 5:
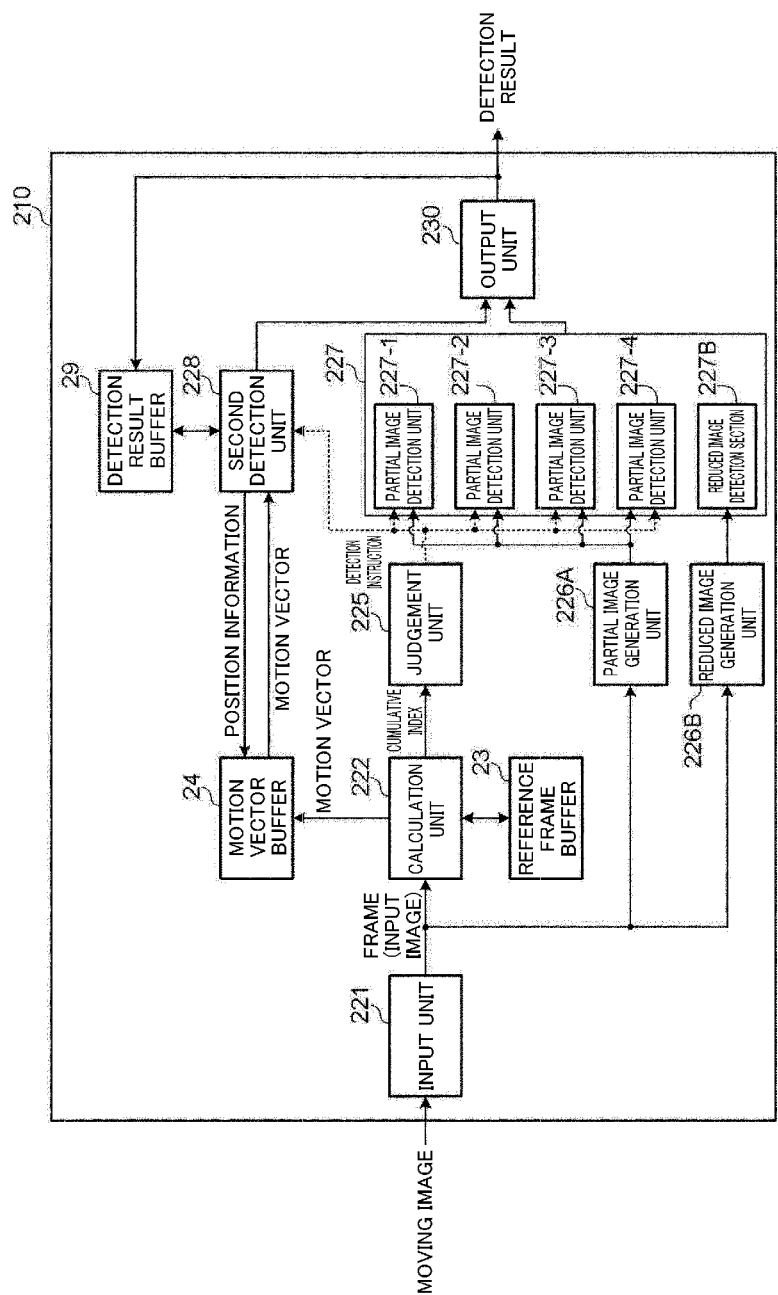
FIG. 5 is a block diagram showing an example of a functional configuration of an object detection device according to a second embodiment.

First, a functional configuration of the object detection device according to the second embodiment will be described. FIG. 5 is a block diagram showing an example of the functional configuration of the object detection device 210 according to the second embodiment. As shown in FIG.

5, the object detection device 210 includes, as the functional configuration, an input unit 221, a calculation unit 222, a reference frame buffer 23, a motion vector buffer 24, a judgement unit 225, a partial image generation unit 226A, and a reduced image generation unit 226B. Further, the object detection device 210 includes, as the functional configuration, a first detection unit 227, a second detection unit 228, a detection result buffer 29, and an output unit 230. Further, the first detection unit 227 has a partial image detection unit 227-$m$ ($m$=1, 2, 3, and 4) and a reduced image detection unit 227B. The respective function configurations are realized when the CPU 11 reads an object detection program stored in the ROM 12 or the storage 14 and develops and performs the read program on the RAM 13.

Note that, in the functional configuration of the object detection device 210 according to the second embodiment and the functional configuration of the object detection device 10 according to the first embodiment, in the functional configurations in which the last two digits of the numeral of the code are common, detailed description for common contents will be omitted.

The input unit 221 outputs a frame n of the moving image as a target frame to each of the calculation unit 222, the partial image generation unit 226A, and the reduced image generation unit 226B.

Figure 6:
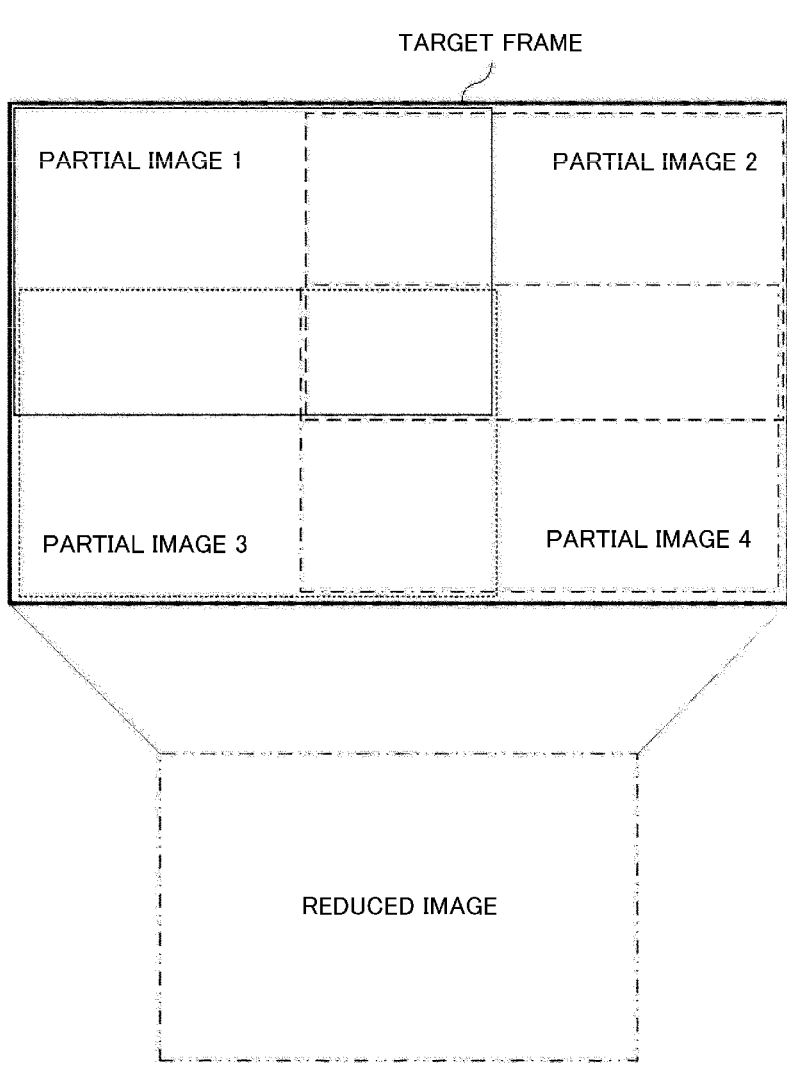
FIG. 6 is a diagram for explaining a generation of a partial image and a reduction image.

The partial image generation unit 226A generates a plurality of partial images obtained by dividing the target frame into a plurality of parts. For example, the partial image generation unit 226A extracts, as shown in FIG. 6, four parts positioned at higher left, higher right, lower left and lower right of the target frame and overlapped with each other, respectively. Then, the partial image generation unit 226A generates each extracted parts as a partial image 1 (solid line), a partial image 2 (broken line), a partial image 3 (dotted line) and a partial image 4 (dot-dash line), m of the partial image m (where, $m$=1, 2, 3, and 4) is the number of the partial image. Note that, the number of partial images generated by the partial image generation unit 226A is not limited to the example shown in FIG. 6.

The partial image generation unit 226A outputs each generated partial image m to the corresponding partial image detection units 227-$m$. Here, it is assumed that the partial image 1 is outputted to the partial image detection unit 227-1, the partial image 2 is outputted to the partial image detection unit 227-2, the partial image 3 is outputted to the partial image detection unit 227-3, and the partial image 4 is outputted to the partial image detection unit 227-4.

The reduced image generation unit 226B generates the reduced image (two-dot chain line) obtained by reducing the entire target frame as shown in the lower figure of FIG. 6, and outputs it to the reduced image detection unit 227B.

The calculation unit 222 calculates a motion vector field V (N) with reference to the reference frame for the target frame (frame n), as in the calculation unit 22 in the first embodiment. In addition, the calculation unit 222 calculates, for each part (hereinafter referred to as "part m") of the target frame corresponding to each of the partial images m generated by the partial image generation unit 226A, a cumulative index by the same method as the calculation unit 22 in the first embodiment. Specifically, the calculation unit 222 calculates sad (n, m) and diff (n, m) from a part m of the target frame as an index indicating a magnitude of change between the reference frame and the target frame. Further, for each part m of the target frame, the calculation unit 222 calculates sad_ac (m) and diff_ac (m) as the cumulative index indicating the magnitude of change between the key frame and the target frame.

The judgement unit 225 judges whether or not the cumulative index is equal to or greater than a threshold value for each part m in the same manner as the judgement unit 25 in the first embodiment. When the cumulative index of the part m is equal to or more than the threshold value, the judgement unit 225 outputs a detection instruction for instructing the object detection processing to the partial image detection unit 227-*m* corresponding to the partial image m. Specifically, the judgement unit 225 outputs the detection instruction to the partial image detection unit 227-1 when sad_ac (1)≥TH_sad or diff_ac (1)≥_TH_diff are satisfied. In addition, the judgement unit 225 outputs the detection instruction to the partial image detection unit 227-2 when sad_ac (2)≥TH_sad or diff_AC (2)≥TH_diff. In addition, the judgement unit 225 outputs the detection instruction to the partial image detection unit 227-3 when sad_ac (3)≥_TH_sad or diff_ac (3)≥_TH_diff. In addition, the judgement unit 225 outputs the detection instruction to the partial image detection unit 227-4 when sad_ac (4)≥_TH_sad or diff_ac (4)≥_TH_duff. On the other hand, the judgement unit 225 outputs the detection instruction about the part m to the second detection unit 228 when the cumulative index of the part m is less than the threshold value.

Note that, in order to level the processing amount, the judgement unit 225 may output the detection instruction to the second detection unit 228 for a predetermined number of parts m in which sad (n, m) or diff (n, m) is lower. In this case, the judgement unit 225 outputs the detection instruction to the corresponding partial image detection unit 227-*m* of the first detection unit 227 for the remaining parts m.

Each detection unit included in the first detection unit 227 detects a region indicating the object from the partial image m or the reduced image by using the object detection model, as in the first detection unit 27 in the first embodiment, and outputs a detection result including attribute of the object, reliability, rectangular information and the like. That is, the detection result of the partial image (m) is outputted from the partial image detection unit 227-*m* to which the detection instruction is outputted. In addition, a detection result about the reduced image is outputted for each frame for the reduced image detection unit 227B. Note that, it is assumed that, for the rectangular information, the information converted into the coordinates in the image of the target frame is outputted in both the case of the partial image m and the reduced image.

The second detection unit 228 detects a region on the part m of the target frame, which is obtained by correcting a position of the region detected in the reference frame by using the motion vector, for the part m to which the detection instruction is outputted from the judgement unit 225. More specifically, the second detection unit 228 acquires the detection result of the reference frame stored in the detection result buffer 29, similarly to the second detection unit 28 in the first embodiment. Then, the second detection unit 228 acquires a motion vector about the coordinates (position information) of the part m of the target frame corresponding to the center coordinates of the rectangular information of each object detected in the part m of the reference frame from the motion vector buffer 24. Then, the second detection unit 228 specifies coordinates on the part m of the target frame corresponding to the position obtained by correcting the center coordinates of the rectangle in the reference frame by the acquired motion vector. The second detection unit 228 detects a rectangle having the specified coordinate as a center coordinate and having the same size as the rectangle in the reference frame from the part m of the target frame.

Note that, when the rectangle whose position is corrected exceeds the range of the part M of the target frame, the rectangle can be detected from the other part m. In this case, the second detection unit 28 may perform processing in which the rectangle is not detected from the part m of the target frame without performing processing such as correcting the position of the rectangle so as not to exceed the range of the part m.

The output unit 230 integrates the detection result of the first detection unit 227 and the detection result of the second detection unit 228, outputs the detection result of the target frame, and stores it in the detection result buffer 29. Specifically, the output unit 230 acquires the detection result of the partial image m (m=1, 2, 3, and 4) from the partial image detection unit 227-*m* and the second detection unit 228. For example, it is assumed that the judgement unit 225 outputs the detection instruction to each of the partial image detection units 227-1 and 227-2 for the part 1 and the part 2, and outputs the detection instruction to the second detection unit 228 for the part 3 and the part 4. In this case, the output unit 230 acquires the detection result of the partial image 1 from the partial image detection unit 227-1, acquires the detection result of the partial image 2 from the partial image detection unit 227-2 and acquires the detection results of the partial image 3 and the partial image 4 from the second detection unit 228. Further, the output unit 230 acquires the detection result of the reduced image outputted from the reduced image detection unit 227B. Each detection result includes a plurality of regions detected from each image, that is, a detection result for a plurality of objects.

Then, when the detection result of the reduced image and the detection result of the partial image are determined to be the detection result of the same object, the output unit 230 deletes the detection result of the partial image. More specifically, the output unit 230 judges whether or not the positions of regions in which the attributes of the object match are in a corresponding positional relationship on the target frame in the region included in the detection result of the reduced image and in the region included in the detection result of each part image m. For example, the output unit 230 may judge that both regions are in the corresponding positional relationship on the target frame when the overlap degree of regions in which the attributes of the object match is equal to or greater than a predetermined threshold value TH_S1.

For example, the output unit 230 may calculate a value obtained by dividing the area in which regions in which the attributes of the object match overlap by the area of the region included in the detection result of the reduced image as the overlap degree in the region included in the detection result of the reduced image and in the region included in the detection result of the partial image m. The area of each region and the overlap area are calculated based on the rectangular information of each region. Note that the rectangular information of each region is converted into coordinate values within the image coordinates of the target frame as described above. When the calculated overlap degree is equal to or more than the predetermined threshold TH_S1, the output unit 230 deletes the detection result about the corresponding region from the detection result of the partial image m. For an object existing across the plurality of partial images, the region is divided into each of the plurality of partial images, and the detection result is included. Therefore, since all of these detection results are deleted as being common to one of the detection results included in the reduced image, the detection result of the corresponding region is deleted from the detection result of the partial image m instead of the detection result of the reduced image.

Note that the method of judging whether or not the region is to be deleted from the detection result of the partial image m is not limited to the above example. For example, the output unit 230 judges whether or not the overlap degree is equal to or greater than the threshold value TH_S1 and a ratio of an area of the region included in the detection result of the reduced image to an area of the region included in the detection result of the partial image m is equal to or greater than the predetermined threshold value TH_S2. When the judgement condition is satisfied, the output unit 230 may delete the detection result of the corresponding region from the detection result of the partial image m. When the size of the region included in the reduced image is relatively large with respect to the size of the target frame and a plurality of regions having the same attribute as the region exist in the partial image in, the overlap degree between the region of the reduced image and each of the plurality of regions of the partial image may exceed the threshold value TH_S1. In consideration of such a case, not only the correspondence of the positional relation between the region included in the reduced image and the region included in the partial image but also the size of the region is equal to each other is determined, thereby preventing the detection result of the region included in the partial image m from being erroneously deleted.

Further, for example, the output unit 230 may delete, in addition to the judgment by using the overlap degree and the set of overlap degree and area ratio, the detection result of the region included in the partial image m by the following judgement. Specifically, the output unit 230 judges whether or not a region having the attribute of the object which does not match any of the attributes of each object in all regions included in the detection result of the reduced image is included in the detection result of the partial image m. When a region in which the attributes of the object do not match any of the attributes exists in the partial image m, the output unit 230 judges whether or not a value obtained by dividing the area of the region by the area of the target frame is equal to or more than a predetermined threshold value TH 53. When the obtained value is equal to or more than the threshold value TH 53, the output unit 230 deletes the detection result of the corresponding region from the detection result of the region included in the partial image m. Thus, since a region indicating one object exists across the plurality of partial images, erroneous detection caused by dividing the feature quantity of the object and extracting it by one partial image m is eliminated.

The output unit 230 collects respective detection results of the partial image m and the reduced image remaining after the processing and outputs them as a final detection result.

Figure 7:
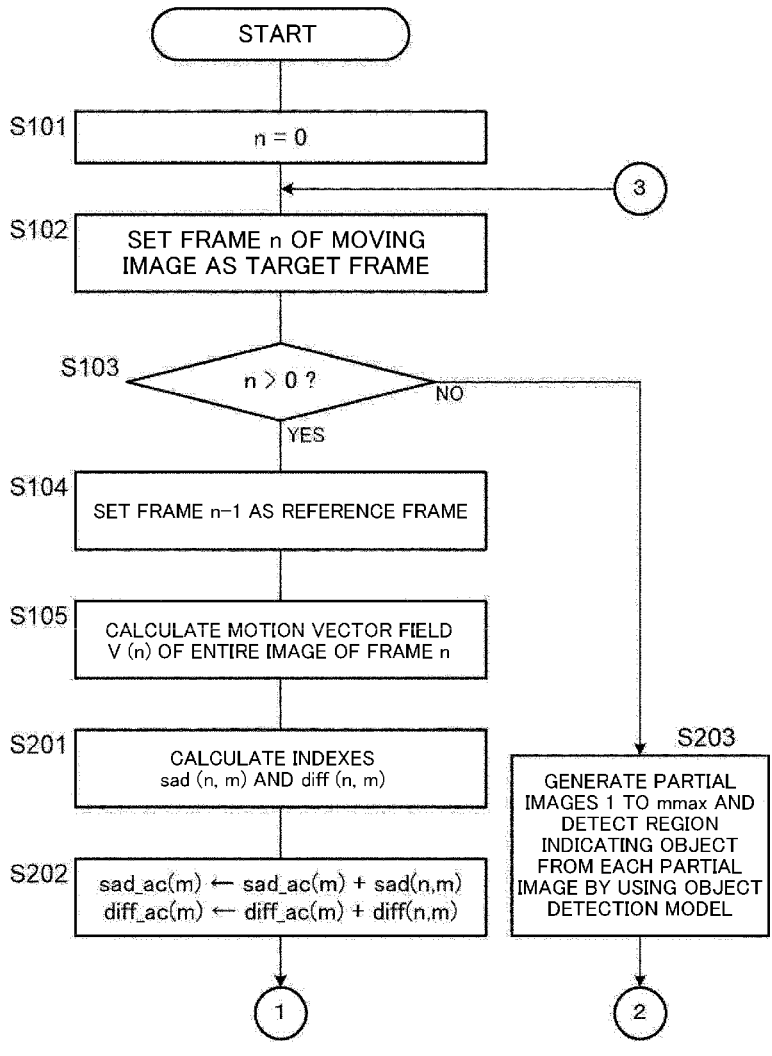
FIG. 7 is a flowchart showing a flow of the object detection processing according to the second embodiment.
Figure 8:
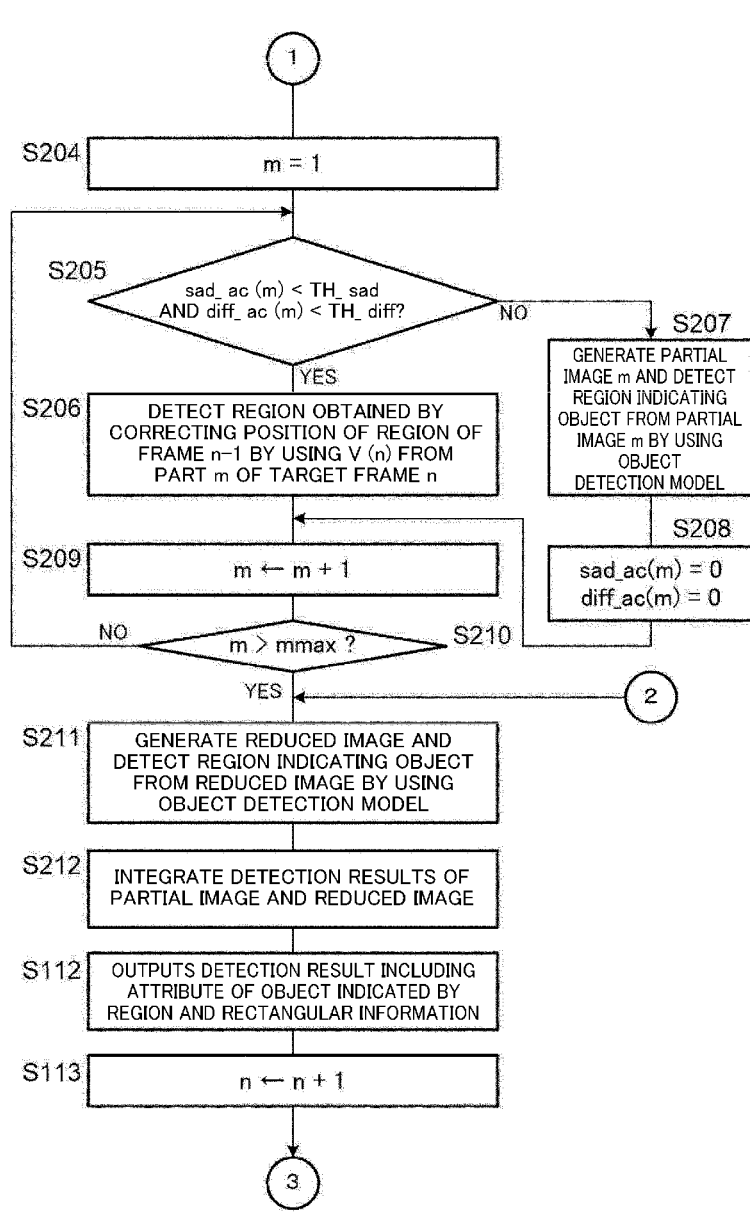
FIG. 8 is a flowchart showing the flow of the object detection processing according to the second embodiment.

Next, the operation of the object detection device 210 will be described. FIGS. 7 and 8 are flowcharts showing a flow of the object detection processing by the object detection device 210. The CPU 11 reads the object detection program from the ROM 12 or the storage 14, develops the program in the RAM 13 and executes the program, thereby performing the object detection processing. In the object detection processing in the second embodiment, the same processing as that in the object detection processing in the first embodiment (FIG. 4) is given the same step numbers, and detailed description thereof is omitted.

When it is judged that n=0 is satisfied in the step S103 through the steps S101 and S102, the processing proceeds to a step S203. When the motion vector field V (n) of the frame n is calculated through steps S104 to S105, the processing proceeds to a step S201.

In a step S201, the CPU 11 calculates, as the calculation unit 222, sad (n, m) and diff (n, m) as indexes indicating the magnitude of change between the reference frame and the target frame for each part m of the frame n.

Next, in a step S202, the CPU 11 adds, as the calculation unit 222, sad (n, m) calculated in the step S201 to sad_ac (m), and the diff (n, m) calculated in the step S201 to the dill ac (m) for each part m of the frame n. Thus, the calculation unit 222 calculates the cumulative index from the key frame to the target frame. Then, the CPU 11 outputs, as the calculation unit 222, the calculated cumulative index to the judgement unit 225, and the processing proceeds to a step S204 (FIG. 8).

In a step S203, the CPU 11 outputs, as the judgement unit 225, the detection instruction to each of the partial image detection parts 227-m. Further, the CPU 11 generates, as the partial image generation unit 226A, partial images 1 to mmax from the frame n and outputs them to the corresponding partial image detection unit 227-m, mmax is the maximum value of the number of the partial image, and it is "4" here. That is, the partial image 1, the partial image 2, the partial image 3, and the partial image 4 are generated. Then, the CPU 11 receives, as each of the partial image detection units 227-m, the partial image m outputted from the partial image generation unit 226A and detects a region indicating the object from the partial image m by using the object detection model. Further, the CPU 11 outputs, as the partial image detection unit 227-m, the detection result including the attribute of the object, the reliability, the rectangular information, etc. for each region detected from the partial image m to the output unit 230, and the processing proceeds to a step S211 (FIG. 8).

In a step S204 (FIG. 8), the CPU 11 sets, as the judgement unit 225, 1 to a variable m indicating the number of the partial image.

Next, in a step S205, the CPU 11, as the judgement unit 225, judges whether or not sad_ac (m) is less than a threshold value TH_sad and dill ac (m) is less than a threshold value TH_duff. When sad_ac (m)<TH_sad and diff_ac (m)<TH_diff, the processing proceeds to a step S206, and when sad_ac (m)≥_TH_sad or diff_ac (m)≥_TH_diff, the processing proceeds to a step S207.

In the step S206, the CPU 11 outputs, as the judgement unit 225, the detection instruction for instructing the object detection of the part m to the second detection unit 228. Then, the CPU 11, as the second detection unit 228, detects a region of the part m of the frame n in which the position of the region detected in the frame n−1 is corrected by using the motion vector. Further, the CPU 11 outputs, as the second detection unit 228, the detection result including the attribute of the object, the reliability, the rectangular information, etc. for each of regions detected from the part m of the frame n to the output unit 230, and the processing proceeds to a step S209.

On the other hand, in the step S207, the CPU 11 outputs, as the judgement unit 225, the detection instruction to the partial image detection unit 227-m. In addition, the CPU 11 generates, as the partial image generation unit 226A, the partial image m from the frame n and outputs it to the partial image detection unit 227-m. Then, the CPU 11 receives, as the partial image detection unit 227-m, the partial image m outputted from the partial image generation unit 226A, and detects a region indicating the object from the partial image m. Further, the CPU 11 outputs, as the partial image detection unit 227-*m*, the detection result including the attribute of the object, the reliability, the rectangular information, etc. for each of regions detected from the partial image m to the output unit 230.

Next, in a step S208, the CPU 11 initializes, as the judgement unit 225, sad_ac (m) and dill ac (m) which are the cumulative indexes calculated by the calculation unit 222, that is, 0 is set, and the processing proceeds to a step S209.

In the step S209, the CPU 11 increments m by one as the judgement unit 225. Then, in a step S210, the CPU 11, as the judgement unit 225, judges whether or not m exceeds mmax. When m>mmax is satisfied, the processing proceeds to a step S211, and when m≤mmax is satisfied, the processing returns to the step S205.

In the step S211, the CPU 11 generates, as the reduced image generation unit 226B, the reduced image obtained by reducing the entire frame n, and outputs it to the reduced image detection unit 227B. Then, the CPU 11 detects, as the reduced image detection unit 227B, a region indicating the object from the reduced image by using the object detection model, and outputs the detection result including the attribute, the reliability, the rectangular information, etc. of the object.

Next, in a step S212, the CPU 11 receives, as the output unit 230, the detection results outputted on the steps S206, S207 and S211, and integrates the detection result of the reduced image and the detection result of the partial image m by deleting the common detection result. Next, in a step S112, the CPU 11 outputs, as the output unit 230, the detection result integrated in the step S212 as the final detection result of the frame n and stores it in the detection result buffer 29.

As described above, the object detection device according to the second embodiment performs the object detection on the target frame by using the object detection model when the index calculated by using the motion vector is equal to or greater than the threshold value, similarly to the first embodiment. On the other hand, when the index is less than the threshold value, the object detection device detects a region on the target frame in which the position of the region detected in the reference frame is corrected by using the motion vector. In this case, the object detection device executes calculation of the index, judgement of the threshold value, and processing of the object detection for each partial image. In addition, the object detection device performs the object detection from the reduced image obtained by reducing the target frame by using the object detection model, and integrates the detection result of the reduced image and the detection result of the partial image. Thus, as in the first embodiment, the object detection device according to the second embodiment can improve, in the object detection on the moving image, the efficiency without reducing the accuracy. Further, the object detection device according to the second embodiment can detect a region using the detection result of the reference frame for each part in which a change in motion is small by dividing the target frame into partial images and executing various types of processing, and can further improve the efficiency. Further, the object detection device according to the second embodiment integrates detection results of the reduced image and the partial image, thereby, it is possible to detect an object in which the detection is difficult when reducing the size and having a relatively small size with respect to a target frame, and a relatively large object across the plurality of partial images can be detected. Therefore, the object detection device according to the second embodiment can perform the efficient object detection without reducing the accuracy of object detection even when a high-definition moving image is targeted.

Note that, in the second embodiment, the case where the first detection unit includes the partial image detection unit and the reduced image detection unit has been described, but it is also possible to include only the partial image detection unit. Even in this case, the efficiency can be improved by detecting the region using the detection result of the reference frame for each part in which the change of the motion is small.

Further, in the second embodiment, the case where the partial image detection unit is provided for each generated partial image has been described, but the present invention is not limited thereto. At least one partial image detection unit may be provided, and a detection instruction about the partial image judged to perform the object detection by the object detection model by the judgement unit may be outputted to the partial image generation unit. In this case, only the partial image to be instructed to be detected is outputted from the partial image generation unit to the partial image detection unit.

Further, in each of the above embodiments, the case where the object detection using the object detection model is skipped when both of the prediction difference absolute value sum sad of the motion compensation and the cumulative value of the difference absolute value sum diff of the motion vector component are less than the threshold value has been described, but this is not limited thereto. When either one of the indexes is less than the threshold value, the object detection using the object detection model may be skipped. In addition, when one index using sad and diff, such as the product of sad and diff and the weighted sum, is less than the threshold value, the object detection using the object detection model may be skipped. Further, as an index indicating the magnitude of change between the key frame and the target frame, an index other than sad and diff may be used.

In addition, in the above embodiments, the reference frame is defined as a frame immediately before the target frame, but the present invention is not limited thereto. Note that, in the case where the reference frame is a key frame which is a closest frame in which the object detection is performed by the object detection model, the processing for accumulating the indexes is not required as in the above-described embodiments.

Note that various processors other than the CPU may execute the object detection processing executed by the CPU reading the software (the program) in the embodiment. As the processor in this case, a dedicated electric circuit that is a processor having a circuit configuration designed exclusively for the purpose of execution of specific processing, such as a Programmable Logic Device (PLD) whose circuit configuration can be changed after manufacturing such as a Field-Programmable Gate Array (FPGA) or the like, an Application Specific Integrated Circuit (ASIC), or the like is exemplified. Further, the object detection may be performed by one of these various types of processors or by a combination of two or more processors of the same type or different types (for example, a plurality of FPGAs or a combination of a CPU and an FPGA). Furthermore, more specifically, the hardware structure of these various processors is an electrical circuit combining circuit elements such as semiconductor elements.

More specifically, each of the functional configurations (the respective units shown in FIGS. 2 and 5) described in the above embodiments may be realized by dedicated circuits, and a plurality of dedicated circuits may operate in parallel within an LSI (Large-Scale Integration). In addition, a part of the functional configuration may be realized by a dedicated circuit, and other functional configurations may be realized by the CPU with reading and executing the software (the program). For example, the CPU in the LSI may execute the processing of the functional configuration such as the judgement unit and the second detection unit in each of the above embodiments with a small amount of processing, and the dedicated circuits may be applied to the other units.

Further, in the embodiment, the embodiment in which object detection program is stored (installed) in the ROM 12 or the storage 14 has been described, but the present invention is not limited thereto. The program may be provided in a form stored in a non-transitory storage medium such as a Compact Disk Read Only Memory (CD-ROM), a Digital Versatile Disk Read Only Memory (DVD-ROM), and a Universal Serial Bus (USB) memory. In addition, the program may be downloaded from an external device over a network.

The following supplement will be further disclosed for the embodiments.

(Additional remark 1)

An object detection device includes a memory and
    at least one processor connected to the memory,
    Wherein
    the processor
    sets each frame of a moving image including a plurality of frames as a target frame, calculates a motion vector with reference to a reference frame over the entire target frame, calculates an index indicating a magnitude of change between a key frame and the target frame represented by using the motion vector,
    judges whether or not the calculated index is equal to or more than a predetermined threshold value,
    detects a region indicating an object from the target frame using an object detection model when the index is equal to or greater than the threshold value,
    detects a region on the target frame obtained by correcting a position of the region detected in the reference frame by using the motion vector when the index is less than the threshold value, and
    outputs information on the region detected from the target frame.

(Additional remark 2)

A non-transitory recording medium storing a program executable by a computer so as to execute an object detection processing, wherein
    the object detection processing
    sets each frame of a moving image including a plurality of frames as a target frame, calculates a motion vector with reference to a reference frame over the entire target frame, calculates an index indicating a magnitude of change between a key frame and the target frame represented by using the motion vector,
    judges whether or not the calculated index is equal to or more than a predetermined threshold value,
    detects a region indicating an object from the target frame using an object detection model when the index is equal to or greater than the threshold value,
    detects a region on the target frame obtained by correcting a position of the region detected in the reference frame by using the motion vector when the index is less than the threshold value, and
    the threshold value, and outputs information on the region detected from the target frame.

REFERENCE SIGNS LIST

10, 210 Object detection device
11 CPU
12 ROM
13 RAM
14 Storage
15 Input unit
16 Display unit
17 Communication I/F
19 Bus
21, 221 Input unit
22, 222 Calculation unit
23 Reference frame buffer
24 Motion vector buffer
25, 225 Judgement unit
26 Image formation unit
226A Partial image generation unit
226B Reduced image generation unit
27, 227 First detection unit
227-1 to 227-4 Partial image detection unit
227B Reduced image detection unit
28, 228 Second detection unit
29 Detection result buffer
30, 230 Output unit

The invention claimed is:

1. An object detection device comprising:
a memory; and
at least one processor coupled to the memory,
wherein the at least one processor is configured to:
calculate a motion vector of a target frame, wherein the target frame represents a current frame of a series of frames of images collectively describing a moving image, the moving image depicts an object in motion, the motion vector indicates change of a location of the object in the target frame in pixels as the object having moved from a previous location in a reference frame to a current location in the current frame, and the reference frame represents a preceding frame that precedes the current frame in the series of frames of images;
calculate, based on the motion vector, an index indicating a magnitude of change of locations of the object between a key frame and the target frame, wherein the key frame represents the closest previous frame of the series of frames where the object was detected by processing an object detection model;
when the index is equal to or greater than a predetermined threshold value, detect a first region indicating the object in the target frame by using the object detection model;
when the index is less than the predetermined threshold value, detect a second region indicating the object in the target frame by correcting a position of the location of the object detected in the reference frame according to the motion vector; and
output, selectively based on first information of the first region and second information of the second region according to the index, an updated location of the object in the target frame of the series of frames of images with accuracy.

2. The object detection device according to claim 1, wherein:
the key frame is a frame closest to the target frame among frames in which the first region is detected, and calculate a cumulative value of the index obtained in each frame from the key frame to the target frame as an index for comparison with the predetermined threshold value.

3. The object detection device according to claim 1, wherein:

the index is at least one of an index indicating a magnitude of prediction error of motion compensation by using the motion vector or an index indicating a magnitude of variation of the motion vector.

4. The object detection device according to claim 1, wherein the at least one processor is further configured to:

generate a plurality of partial images obtained by dividing the target frame into a plurality of parts;

calculate the index for each partial image of the plurality of partial images, judge whether or not the index is equal to or greater than the predetermined threshold value for each partial image of the plurality of partial images, detect the first region indicating the object from a partial image for which the index is equal to or greater than the predetermined threshold value, detect the second region indicating the object from a partial image for which the index is less than the predetermined threshold value, and integrate the first region and the second region, and output information on a region indicating the object in the target frame.

5. The object detection device according to claim 4, wherein the at least one processor is further configured to:

generate a reduced image obtained by reducing an entirety of the target frame, detect the first region indicating the object from the reduced image.

6. The object detection device according to claim 1, wherein:

the object detection model is a convolutional neural network.

7. An object detection method comprising:

by a computer, calculating a motion vector of a target frame, wherein the target frame represents a current frame of a series of frames of images collectively describing a moving image, the moving image depicts an object in motion, the motion vector indicates change of a location of the object in the target frame in pixels as the object having moved from a previous location in a reference frame to a current location in the current frame, and the reference frame represents a preceding frame that precedes the current frame in the series of frames of images;

calculating, based on the motion vector, an index indicating a magnitude of change of locations of the object between a key frame and the target frame, wherein the key frame represents the closest previous frame of the series of frames where the object was detected by processing an object detection model;

when the index is equal to or greater than a predetermined threshold value, detecting a first region indicating the object in the target frame by using the object detection model;

when the index is less than the predetermined threshold value, detecting a second region indicating the object in the target frame by correcting a position of the location of the object detected in the reference frame by using according to the motion vector; and outputting, selectively based on first information of the first region and second information of the second region according to the index, an updated location of the object in the target frame of the series of frames of images with accuracy.

8. A non-transitory computer readable medium storing a program executable by a computer to perform a process for object detection processing, the process comprising:

calculating a motion vector of a target frame, wherein the target frame represents a current frame of a series of frames of images collectively describing a moving image, the moving image depicts an object in motion, the motion vector indicates change of a location of the object in the target frame in pixels as the object having moved from a previous location in a reference frame to a current location in the current frame, and the reference frame represents a preceding frame that precedes the current frame in the series of frames of images;

calculating, based on the motion vector, an index indicating a magnitude of change of locations of the object between a key frame and the target frame, wherein the key frame represents the closest previous frame of the series of frames where the object was detected by processing an object detection model;

when the index is equal to or greater than a predetermined threshold value, detecting a first region indicating the object in the target frame by using the object detection model;

when the index is less than the predetermined threshold value, detecting a second region indicating the object in the target frame by correcting a position the location of the object detected in the reference frame according to the motion vector; and outputting, selectively based on first information of the first region and second information of the second region according to the index, an updated location of the object in the target frame of the series of frames of images with accuracy.

* * * * *